United States Patent [19]

Ladwein

[11] Patent Number: 4,793,388

[45] Date of Patent: Dec. 27, 1988

[54] APPARATUS FOR TREATING FLOWABLE MATERIALS

[75] Inventor: Bernhard Ladwein, Überherrn-Altforweiler, Fed. Rep. of Germany

[73] Assignee: Rosemarie Ladwein, Überherrn-Altforweiler, Fed. Rep. of Germany

[21] Appl. No.: 24,328

[22] Filed: Mar. 10, 1987

[30] Foreign Application Priority Data

Mar. 12, 1986 [DE] Fed. Rep. of Germany ....... 3608103

[51] Int. Cl.[4] .............................................. B65G 65/30

[52] U.S. Cl. ........................................ 141/98; 141/69; 141/84; 220/1.5; 414/293

[58] Field of Search .................................... 141/69-83, 141/85-93, 285-310, 11, 84, 98; 220/1.5; 414/291, 293, 328, 329

[56] References Cited

U.S. PATENT DOCUMENTS

| | | | |
|---|---|---|---|
| 3,792,790 | 2/1974 | Brubaker | 414/293 |
| 3,911,976 | 10/1975 | Rosen | 141/84 |
| 4,077,441 | 3/1978 | Rosen et al. | 141/84 |
| 4,678,389 | 7/1987 | Bonerb | 414/267 |
| 4,714,097 | 12/1987 | Binzen et al. | 141/93 X |

*Primary Examiner*—Henry J. Recla
*Assistant Examiner*—Ernest G. Cusick
*Attorney, Agent, or Firm*—Peter K. Kontler

[57] ABSTRACT

Modular apparatus for mixing, storing, metering and dispensing flowable materials wherein the modules constitute standard containers for shipment of bulk and other goods and the containers confine and/or support various material treating units. The apparatus can treat and/or store two or more different types of flowable material which are stored separately or in admixture to one another. The containers can be assembled into a group which contains superimposed horizontal and/or upright containers.

20 Claims, 4 Drawing Sheets

APPARATUS FOR TREATING FLOWABLE MATERIALS

BACKGROUND OF THE INVENTION

The invention relates to improvements in apparatus for treating flowable materials, especially to improvements in apparatus for large-scale treatment of flowable solid materials including or constituting the ingredients of cement, mortar and other building materials.

It is known to assemble an apparatus for the treatment of flowable solid materials from a plurality of receptacles in the form of tanks, vessels or the like, and from a plurality of material treating components including mixers, metering units, dispensing units and others. It is also known to more or less permanently install various treating components in or on the receptacles and to separably couple the receptacles to each other at the locale of use. In many instances, the receptacles are specially designed vessels which are produced in small numbers at a considerable cost and must be transported to and from the maker or repairer and to and from storage in dismantled condition or in specially designed vehicles.

It is also known to assemble prefabricated modules into apparatus for the treatment of flowable materials. Reference may be had to German Pat. No. 30 27 069 and to German Offenlegungsschrift No. 34 24 752. These publications disclose modules wherein tubular section or lines can be separably coupled to each other. The majority of components resemble or constitute pipes having a circular cross-sectional outline. The just described apparatus are rather expensive so that they do not come into consideration for a number of applications.

OBJECTS OF THE INVENTION

An object of the invention is to provide a novel and improved apparatus for storage and/or other treatment of flowable materials which is also assembled of several modules but whose versatility exceeds that of heretofore known modular apparatus.

Another object of the invention is to provide an apparatus whose cost is a relatively small fraction of the cost of heretofore known apparatus.

A further object of the invention is to provide an apparatus whose constituents can be readily transported by ship, by railroad cars, by trucks or by cargo planes.

An additional object of the invention is to provide an apparatus which can be assembled, modified or dismantled within short intervals of time.

Another object of the invention is to provide an apparatus whose output and/or capacity can be increased or reduced while the major part, or at least a substantial part, of the apparatus remains intact.

Still another object of the invention is to provide an apparatus which can employ readily available mass-produced components.

A further object of the invention is to provide the apparatus with novel and improved means for supporting and/or confining the material treating units.

SUMMARY OF THE INVENTION

The invention is embodied in an apparatus for treatment of flowable materials, particularly for drying, sifting, storing, metering, dispensing and packing flowable solid materials. The apparatus comprises a plurality of neighboring containers (especially containers of the type used for transport of goods in railroad container cars, in container ships and/or in cargo planes which are designed for reception and storage of containers), and material treating units provided in and/or on at least some of the containers. Means (such as profiled metallic members) can be provided to reinforce some or all of the containers, especially these which are designed to carry one or more containers.

The containers can be arrayed to form a substantially L-shaped group of elongated containers including two substantially horizontal containers which are disposed one above the other and have overlapping or registering first and second ends, and at least one upright contain adjacent the first ends of the horizontal containers. The group can comprise a set of two, three or even more upright containers adjacent the first ends of the horizontal containers and an additional upright container on top of each container of the set.

In accordance with a presently preferred embodiment of the apparatus, the containers include two elongated horizontal containers which are disposed above each other and have registering first and second ends, a first set of three upright containers adjacent the first ends of the horizontal containers, a second set of three upright containers each on top of a container of the first set, a third set of three upright containers adjacent the containers of the first set (with the containers of the first set disposed between the horizontal containers and the containers of the third et), and a fourth set of upright containers each on top of a discrete container of the third set.

The treating units can include a drying unit (e.g., a rotary drum type dryer) in at least one of the containers, a filtering or sifting unit in at least one of the containers, one or more silos for temporary storage of flowable material in at least one of the containers, a packing unit in or on at least one of the containers, a packing unit metering unit in or on at least one of the containers, means for transporting flowable material between at least some of the containers, means for mixing flowable material in at least one of the containers, means for dispensing flowable material from at least one of the containers and/or a packing unit in at least one of the containers. The transporting means can be designed to convey material from one or more containers which are disposed at a first level to one or more containers which are disposed at a higher second level, and such transporting means can comprise one or more bucket conveyors or the like.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
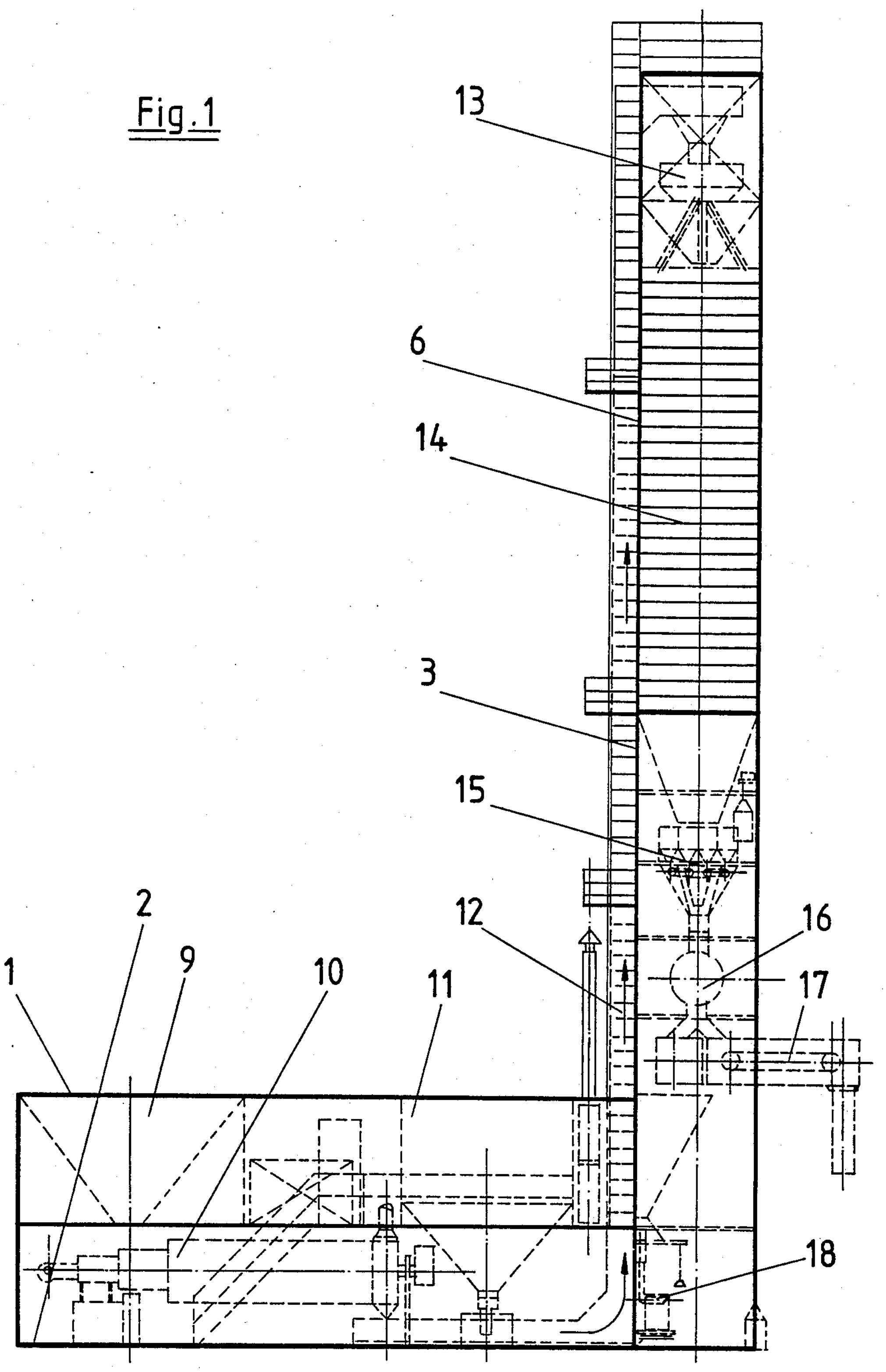
FIG. 1 is a side elevational view of an apparatus which employs a group of eight elongated containers.
Figure 2:
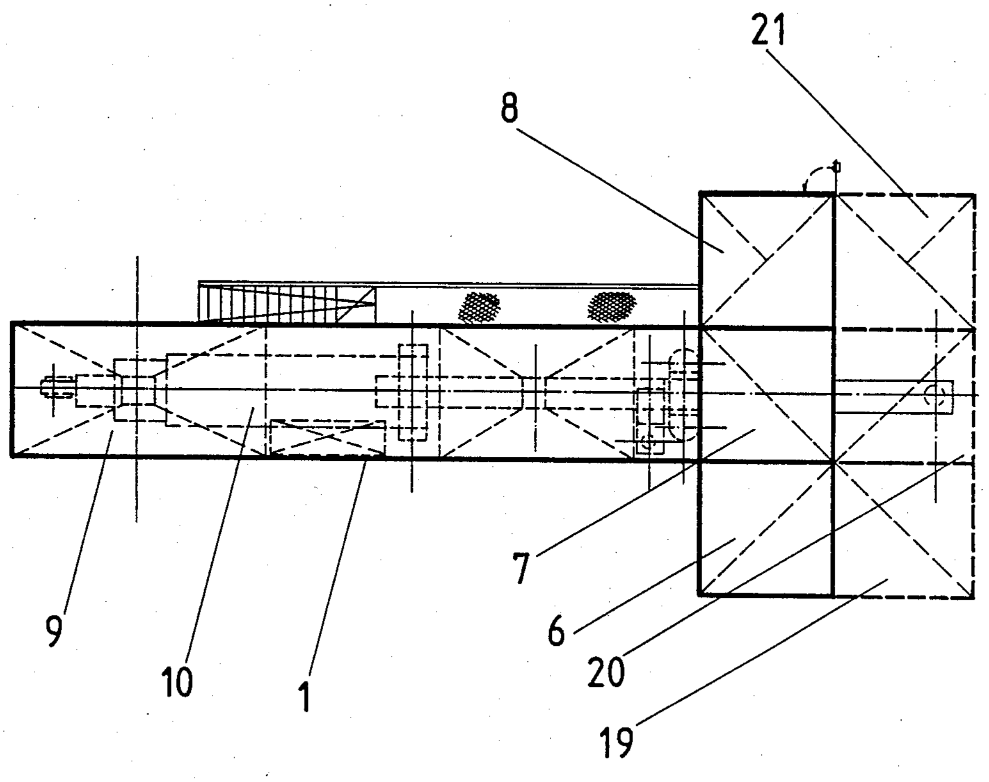
FIG. 2 is a plan view of the apparatus of FIG. 1, three of six additional containers being indicated by broken lines.
Figure 3:
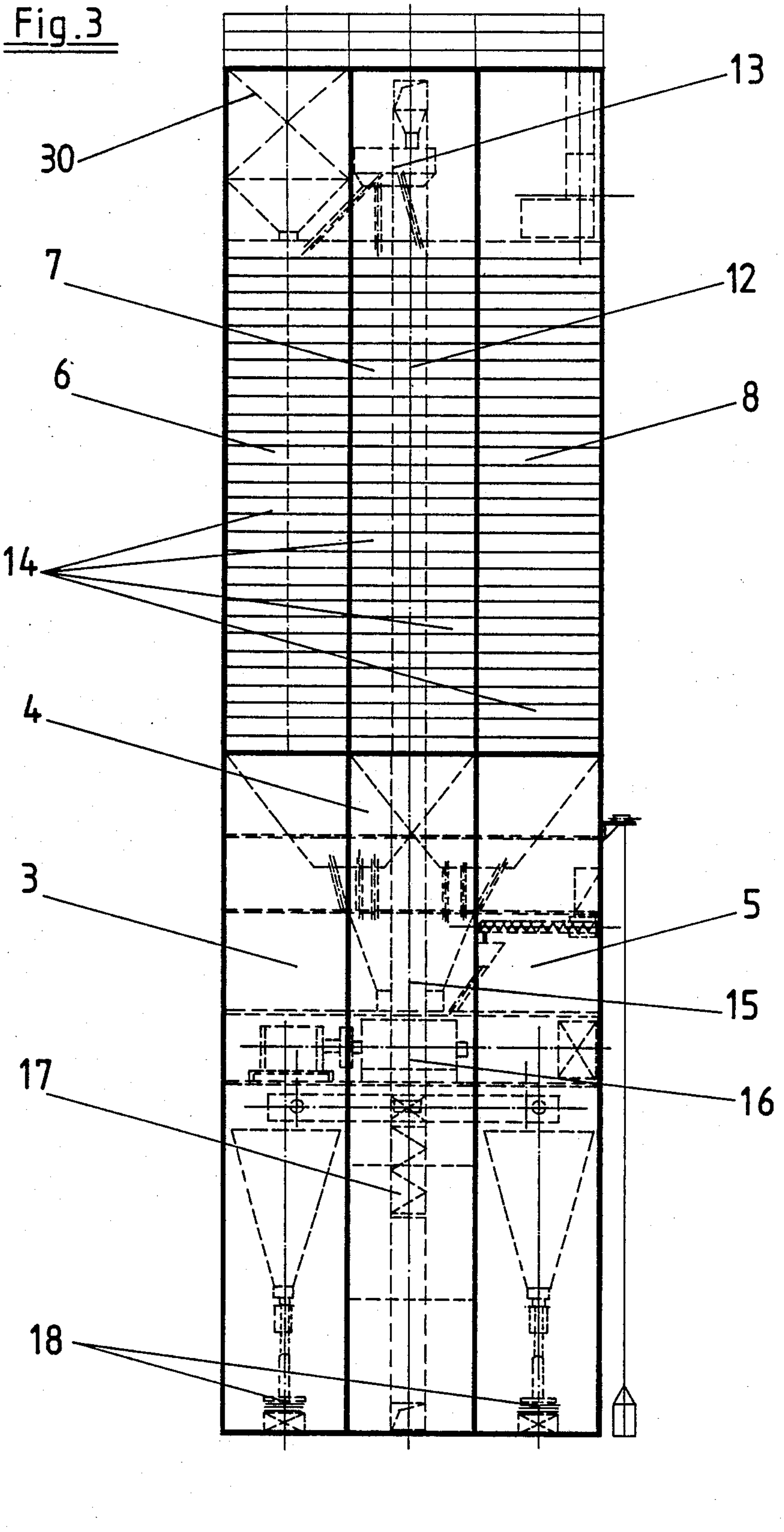
FIG. 3 is a front elevational view of the apparatus as seen from the right-hand side of FIG. 1.

The apparatus which is shown in FIGS. 1 and 3 (and by solid lines in FIG. 2) comprises a total of eight elongated containers including two horizontal containers 1, 2 which are disposed on top of each other so that their ends are in accurate register, a first set of three upright containers 3, 4, 5 which form a row of immediately abutting containers (with the container 4 between the containers 3, 5) and are adjacent the right-hand ends of the containers 1, 2 (as seen in FIG. 1), and a second set of three upright containers 6, 7, 8 respectively disposed on top of the containers 3, 4 and 5. The eight containers together form a substantially L-shaped group with six containers (3-8) in the vertical portion and with two containers (1, 2) in the horizontal portion of the L. All of the neighboring containers are separably connected to each other by straps, bolts, screws and/or other suitable fastener means (not specifically shown). Thus, the container 1 is or can be separably connected to the container 4 and/or 2; the container 2 is or can be separably connected to the container 4; the container 4 is or can be separably connected to the containers 3, 5 and 7; the container 6 is or can be separably connected to the containers 3, 7; and the container 8 is or can be separably connected to the containers 5 and 7. Other combinations of connections are possible, as long as the containers of the group can stand the stresses which develop during treatment of one or more flowable materials, e.g., the ingredients of mortar or other building materials.

Figure 4:
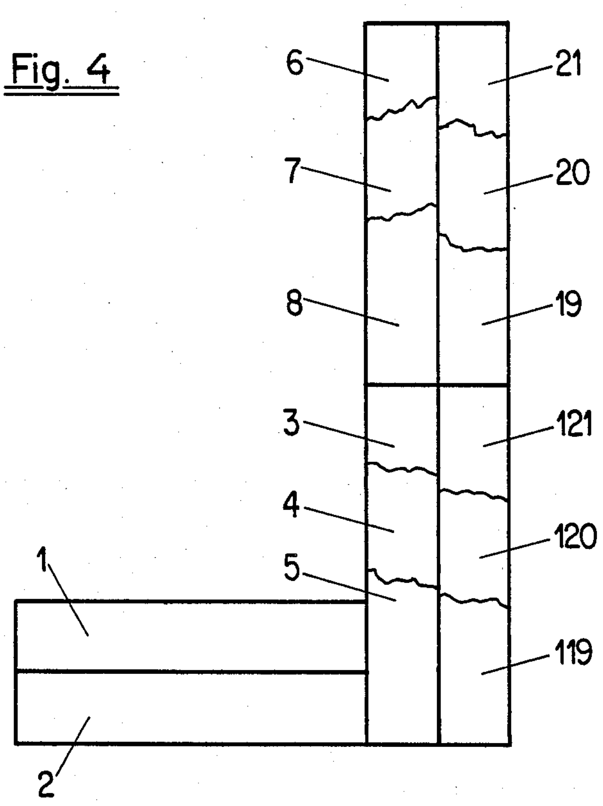
FIG. 4 is a schematic side elevation of view of the apparatus, showing a total of fourteen containers.

The containers of the group which is shown in FIG. 2 further comprise a third set of three upright containers (119, 120, 121(FIG. 4) adjacent the containers 3-5 of the first set (with the containers 3-5 disposed between the containers 119, 120, 121 of the third set and the containers 1, 2), and a fourth set of three upright containers 19, 20, 21 each on top of a container (119, 120, 121) of the third set and each adjacent one of the three upright containers 6-8 of the second set.

It is presently preferred to employ relatively large containers, especially those which are mass-produced for maritime transport of goods on transoceanic container vessels. Such containers exhibit a high stability and can stand long periods of use under adverse conditions. By way of example, each container can be 12 meters long, 2.4 meters wide and 2.6 meters high. Otherwise dimensioned containers can be used with equal or similar advantage. The dimensions of the containers will depend on availability, on the desired capacity of the apparatus and/or on cost.

As can be seen in FIGS. 1 and 2, the upper horizontal container 1 has a funnel-shaped hopper 9 for admission of a selected flowable solid material into the inlet of a horizontal rotary drum-shaped drying unit 10 in the horizontal container 2 wherein the moisture content of the admitted flowable material is or can be reduced to a desired value before the dried material is transferred into a dust separating or dedusting unit 11. The latter is installed in the container 1 and admits batches of flowable material into successive buckets of a bucket type conveyor 12 serving as a means for transporting the material into the range of a sifting or filtering unit 13 a the top of the set of upright containers 6-8. The outlet of the filtering unit 13 can admit sifted material into silos 14 provided in the lower portion of the upright container 6, 7 or 8 (the outlet of the filtering unit 13 can be shifted to a position of register with the silos 14 in the container 6, 7 or 8), and the silos 14 can discharge flowable material into a metering unit 15 in the upright container 4. The metering unit 15 (which can include a suitable weighing device) can admit metered quantities of flowable material into a mixer 16 located ahead of packing units 18 in the upright containers 3, 5. The mixer 16 can also admit flowable material into a conduit 17 for admission of flowable material into the receptacles of trucks which are driven in front of the containers 3-5.

The arrangement may be such that a first flowable material is treated in a first series of steps and is thereupon stored in the silos 14 of the container 6, that a second flowable material is treated and thereupon stored in the silos 14 of the container 7, and that a third flowable material is treated and thereupon stored in the silos 14 of the container 8 before the mixing unit 16 below the metering unit 15 receives predetermined quantities of two or more stored materials for conversion into a mixture which is thereupon fed to the packing units 18 and/or to the conduit 17. The apparatus can comprise a discrete metering unit for each stack of silos 14. The product which is dispensed at 17 or admitted to the packing units 18 can constitute dry mortar or another building material which can be prepared in the apparatus prior to shipment to storage or to the locale or locales of use.

If the apparatus comprises six additional containers (including the containers 19, 20, 21 of FIG. 4), it can comprise additional material treating units or it can provide more storage space for a single type of material, for two different types of material, or for three or more different types of material. The dimensions of the apparatus can be altered practically at will so as to satisfy the requirements in a particular plant If desired or necessary, some or all of the containers can be stiffened by suitable reinforcing means, such as metallic profiles 30 shown schematically in the upper portion of the container 6 of FIG. 3. The metallic profiles 30 can include or constitute V-shaped or L-shaped iron bars and/or other suitable reinforcing means. It is, or it might become, necessary to reinforce the containers which support one or more containers, for example, to reinforce the container 2 beneath the container 1, the containers 3-5 beneath the containers 6-8 and the containers beneath the containers 19-21.

An important advantage of the improved apparatus is its simplicity and relatively low cost. Moreover, the versatility of the improved apparatus is practically unlimited since it can comprise any desired number of containers and the containers can be arrayed in such a way that they occupy space which happens to be available in a plant. In addition, the various treating units in and/or on the containers are readily accessible and such units can be transferred (if necessary) from container to container, depending on the requirements in a particular plant.

The surprising discovery that available mass-produced standard containers can be used to build an apparatus for the treatment of one or more types of flowable materials renders it possible to assemble the apparatus within a short interval of time as well as to increase or reduce the capacity of the apparatus with assistance from standard equipment including cranes and the like. Conventional apparatus for the treatment or storage of flowable materials invariably employ specially designed single-purpose receptacles for flowable material and for the material treating units. It has been found that an apparatus which embodies the invention can be assembled at a cost which is approximately 60 percent of the cost of heretofore known apparatus with specially designed receptacles for flowable materials and for the material treating units.

Another important advantage of the improved apparatus is that, as a rule, containers for transport by ships, in railroad cars or in the holds of cargo planes are dimensioned for transport on roads so that the containers can be readily transported to the locale of use, to a different locale of use or to storage. The treating units which are installed in or on the containers need not be removed or detached during transport of the containers to the locale of use, to storage or elsewhere.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for treatment of flowable materials, particularly for drying, sifting, storing, metering, dispensing and packing of flowable solids materials, comprising a plurality of neighboring modules in the form of containers of the type used for storage of cargo during shipment in railroad container cars, in container ships and in cargo planes; and material treating units provided in and/or on at least some of said containers.

2. The apparatus of claim 1, wherein at least one of said containers is a container for maritime transport of goods.

3. The apparatus of claim 1, further comprising means for reinforcing at least one of said containers.

4. The apparatus of claim 3, wherein said reinforcing means comprises at least one profiled metallic member.

5. The apparatus of claim 1, wherein said containers comprise a substantially L-shaped group of elongated containers including two substantially horizontal containers disposed one above the other and having overlapping first and second ends, and at least one upright container adjacent the first ends of said horizontal containers.

6. The apparatus of claim 5, wherein said group comprises three upright containers adjacent the first ends of said horizontal containers.

7. The apparatus of claim 5, wherein said group further comprises an additional container on top of said upright container.

8. The apparatus of claim 5, wherein said group further comprises an additional upright container adjacent said at least one upright container, said at least one upright container being disposed between said additional container and the first ends of said horizontal containers 9. The apparatus of claim 1, wherein said containers are elongated and include horizontal first and second containers disposed on top of each other and having registering first and second ends, a first set of three upright containers adjacent the first ends of said horizontal containers, and a second set of three upright containers each disposed on top of a discrete container of said first set.

10. The apparatus of claim 9, wherein said containers further include a third set of three upright containers adjacent the containers of said first set, and a fourth set of three containers each disposed on top of a discrete container of said third set, the containers of said first set being disposed between the containers of said third set and the first ends of said horizontal containers.

11. The apparatus of claim 1, wherein said treating units include a rotary drying unit in at least one of said containers.

12. The apparatus of claim 1, wherein said units include a filtering unit in at least one of said containers.

13. The apparatus of claim 1, wherein said units include at least one silo for temporary storage of flowable material.

14. The apparatus of claim 1, wherein said units include a metering unit in at least one of said containers.

15. The apparatus of claim 1, wherein said units include at least one material packing unit.

16. The apparatus of claim 1, wherein said units include means for transporting flowable material between at least some of said containers.

17. The apparatus of claim 1, wherein said units include means for mixing flowable material in at least one of said containers.

18. The apparatus of claim 1, wherein said units include means for dispensing flowable material from at least one of said containers.

19. The apparatus of claim 1, wherein said containers include at least one first container at a lower level and at least one second container at a higher level, said units including means for transporting flowable material from said first into said second container.

20. The apparatus of claim 19, wherein said transporting means comprises a bucket conveyor.

* * * * *